United States Patent
Martin

[15] 3,683,740
[45] Aug. 15, 1972

[54] THREADED BLIND FASTENER

[72] Inventor: Alan Martin, Box 262, Sharon, Mass. 02067

[22] Filed: Jan. 28, 1971

[21] Appl. No.: 110,467

Related U.S. Application Data

[63] Continuation-in-part of Ser. No. 15,683, March 2, 1970, abandoned.

[52] U.S. Cl. ............................85/72, 85/74, 85/78
[51] Int. Cl. ......................F16b 1/00, F16b 13/06
[58] Field of Search............85/72, 70, 73, 74, 77, 78, 85/67, 69, 82, 83, 84, 85; 151/19, 31, 22

[56] References Cited

UNITED STATES PATENTS

| | | | |
|---|---|---|---|
| 1,710,639 | 4/1929 | Hooley | 85/74 |
| 2,385,886 | 10/1945 | Shaff | 85/78 |
| 2,863,351 | 12/1958 | Vaughn | 85/73 |
| 3,203,303 | 8/1965 | Laisy | 85/77 |
| 3,267,205 | 8/1966 | Dozier | 85/72 |
| 3,493,254 | 2/1970 | Summerlin et al | 85/74 |

FOREIGN PATENTS OR APPLICATIONS

| | | | |
|---|---|---|---|
| 30,022 | 12/1910 | Great Britain | 85/73 |
| 388,131 | 2/1933 | Great Britain | 85/67 |
| 727,942 | 4/1955 | Great Britain | 85/72 |
| 1,141,993 | 2/1969 | Great Britain | 85/74 |
| 803,184 | 1/1969 | Canada | 85/72 |
| 945,387 | 11/1948 | France | 85/77 |
| 599,737 | 11/1959 | Italy | 151/22 |
| 174,966 | 4/1935 | Switzerland | 85/85 |
| 240,530 | 4/1946 | Switzerland | 85/82 |

*Primary Examiner*—Marion Parsons, Jr.
*Attorney*—Wolf, Greenfield & Sacks

[57] ABSTRACT

An anchor with a sleeve and an internally threaded base joined together at a relatively weak joint, which allows the sleeve and base to be separated. External threads on the base and internal threads on the sleeve enable the base to screw into the sleeve when the joint is broken and the base is turned into the sleeve.

10 Claims, 10 Drawing Figures

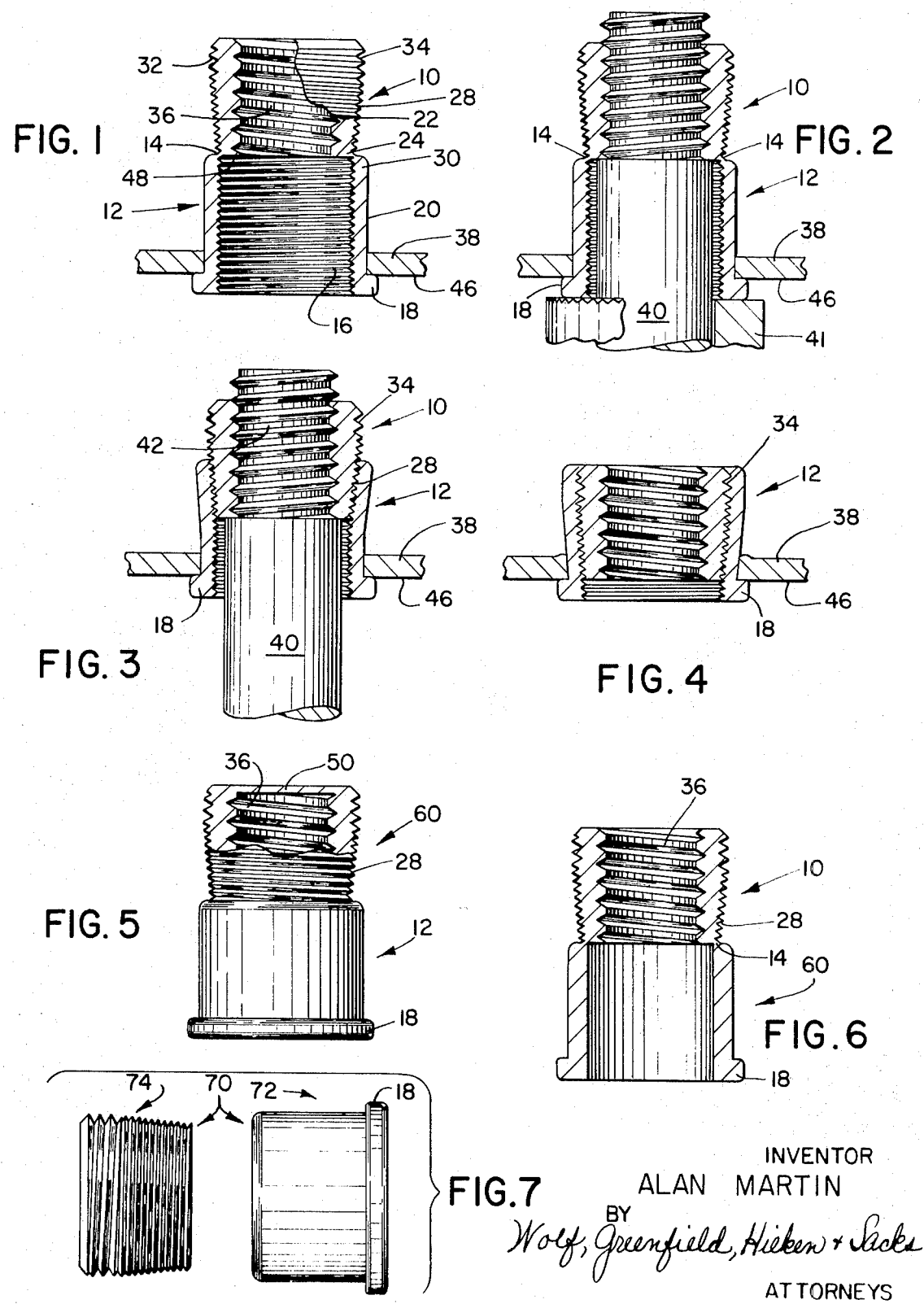

THREADED BLIND FASTENER

RELATED APPLICATION

This application is a continuation-in-part of applicant's copending application Ser. No. 15,683 filed in the U.S. Patent Office Mar. 2, 1970, now abandoned.

BACKGROUND OF THE INVENTION

This invention relates to anchors and more particularly comprises a new and improved nut-type insert anchor.

At the present time a variety of different load bearing anchors are available designed for installation in metal, wood, plastic, and concrete. These anchors basically comprise two parts, namely, a sleeve and a base. Many of them have integrally connected bases and sleeves, and the connection between them breaks when the base is drawn into the sleeve. As the base is drawn into the sleeve, the sleeve expands and frictionally engages the member into which the anchor is being installed as well as the base within the sleeve. The anchor, however, is only as good as the firmness of the installation of the sleeve in the member and the frictional bond between the base and the sleeve. In the anchor nut-type inserts, the sleeves often break under the expansion forces applied as the base is drawn into it, and rupture of the sleeve prevents the sleeve from anchoring firmly in the member on which the anchor is being installed. In all of these forms of anchors, the base acts as a wedge causing the sleeve to expand. Typical of such devices is that shown in Summerlin et al. Pat. No. 3,493,254, dated Feb. 3, 1970.

SUMMARY OF THE INVENTION

One object of this invention is to provide an anchor which applies less stress on the sleeve than other known anchors when the base is drawn into it.

Another object of this invention is to provide an anchor having an improved connection between the base and sleeve, which positively prevents the base from being withdrawn from the sleeve accidentally.

Still another object of this invention is to provide a nut-type anchor which may be installed quickly and as a continuous operation by a threaded bit.

To accomplish the foregoing and other objects, this invention includes among its many features a sleeve and base which in the preferred form are joined together at a weak joint, which joint may be broken easily by a twisting force applied to it. The base is externally threaded, and the sleeve in the preferred form is internally threaded so that when the base is turned with respect to the sleeve after the joint is broken, the base screws into the sleeve and simultaneously applies expanding forces on the sleeve so as to secure the sleeve in the member on which the anchor is to be mounted.

BRIEF DESCRIPTION OF THE DRAWINGS

In the drawings:

FIG. 1 is a cross sectional view of a preferred embodiment of an anchor constructed in accordance with this invention;

FIG. 2 is a cross sectional view similar to FIG. 1 but showing the anchor carried on a bit and positioned to be mounted on a plate;

FIG. 3 is a view similar to FIG. 2 but showing the anchor partially assembled on the plate;

FIG. 4 is a cross sectional view showing the anchor fully mounted on the plate;

FIGS. 5–7 are cross sectional views similar to FIG. 1 but showing other embodiments of this invention;

DESCRIPTION OF PREFERRED EMBODIMENTS

Figure 8:
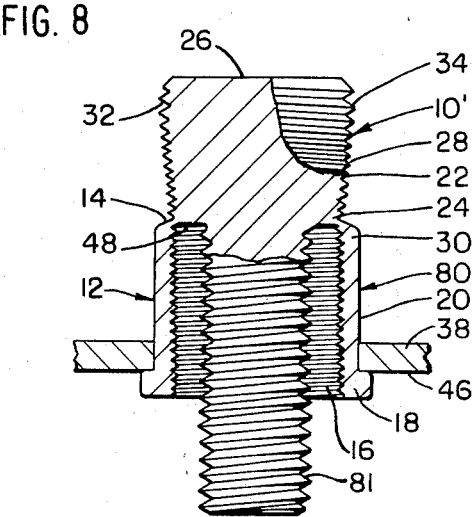
FIGS. 8 and 9 are cross sectional views similar to FIGS. 1 and 4 respectively but showing another embodiment of the invention.

The anchor shown in FIGS. 1–4 includes a base 10 and sleeve 12 secured together at a joint 14 which is relatively weak so that the two may be separated as explained below.

The sleeve 12 is cylindrical in shape, internally threaded as shown at 16, and bears a flange 18 at one end which extends generally radially outward from the outer surface 20 of the sleeve. The flange 18 serves as a shoulder to support one side of the sleeve upon the plate or other member on which the anchor is to be mounted. The flange 18 will engage one side of the plate to prevent the sleeve from being pulled through the opening in the plate from the opposite side. While a relatively prominent flange is shown, it is to be understood that it may be smaller to achieve a flush mounting if desired, or the flange may be omitted entirely.

The base 10 is generally frusto-conical in shape having an outer surface 22 which is smaller at end 24 than at free end 26, and the outer surface 22 is threaded with its threads 28 having the same pitch and direction as the threads 16 in the sleeve 12. The outer diameter of the base 10 at end 24 is substantially the same as the inner diameter of the sleeve 12, so that when the weakened joint 14 actually breaks, the end 24 may begin to thread into the adjacent end 30 of the sleeve without difficulty.

The end 26 of the base 10 is substantially cylindrical at its outer surface as shown at 32, and the surface 32 is provided with threads 34 which are of a different pitch than the threads 28 and 16. The threads 34 serve to lock the base 10 in the sleeve 12 when the base is threaded all the way into the sleeve as shown in FIG. 4.

The base 10 is nut-like in that its inner surface is threaded as suggested at 36, and the threads 36 serve the anchoring function when the device is mounted in the manner suggested in FIG. 4. Thus, when the anchor is mounted, an internally threaded nut is fixed in position on the member, and any desired device may be secured to the member by a screw which threads into the anchor base 10.

In the preferred form, the base 10 is integrally formed from a single steel blank with the sleeve 12, and the direction of the threads 36 is opposite that of the threads 16 and 28. FIGS. 2, 3 and 4 suggest the manner in which the anchor is mounted on a member. In this instance, the member is represented by plate 38. It is to be understood that the member could be thicker than the length of the sleeve 12 or base 10 or even their combined length, and a hole may be provided in the member to receive the entire anchor in its original form. To assemble the part in place, preferably a tool is used having a bit 40 with a threaded end 42 which terminates at shoulder 44. The bit may be manually turned or motor driven, and to mount the anchor in place, the anchor is placed with its flange 18 disposed against the surface 46 of the plate. The bit 40 is screwed into the internal threads 36 of the base 10 to a depth limited by the shoulder 44. The shoulder 44 of the bit engages the internal shoulder 48 of the anchor formed by the end 24 of the base. Rotation of the bit 40 causes the flange 18 to seat on anvil 41 of the tool which preferably has a serrated face, and continued rotation causes the base 10 to break from the sleeve 12 at the weak joint 14, and the threads 28 on the outer surface of the base begin to turn into the threads 16 in sleeve 12. The anvil 41 prevents the sleeve from rotating. This is suggested in FIG. 3. Because the outer surface 22 of the base 10 is tapered and the diameter at the narrow end 24 is substantially equal to the inner diameter of the sleeve 12, continued rotation of the base 10 into the sleeve causes the sleeve to expand about the opening in the plate and lock in position. Continued rotation of the bit 40 causes the base 10 to screw fully into the sleeve, until ultimately the threaded portion 34 on the end 26 of the base reaches the sleeve 12. The threads 34 which are of a different pitch than the threads 16 in the sleeve will cut into the sleeve threads at the end 30, and this action will lock the base in the sleeve in the position shown in FIG. 4. When the anchor is fully mounted on the plate 38 in the manner suggested, the bit 40 may be removed from the anchor merely by reversing its direction or rotation.

The embodiment of FIG. 5 differs from that of FIG. 1 only in the provision of a closure wall 50 at the wider end of the base 10. The closure wall 50 serves to seal the anchor and make the fitting watertight. That is, when the anchor is mounted in place on a member, the threaded hole is closed at the bottom by wall 50 so as to effectively seal the opening provided in the member in which the anchor is mounted. The anchor may be mounted precisely in the manner described above in connection with FIGS. 2–4. That is, the bit may be provided with a threaded section which is shorter axially than the base so that the shoulder on the bit engages the shoulder 48 at the end of the base. Alternatively, the shoulder on the bit may be omitted, and the bit may be threaded into the base until the bit end engages the inside surface of the wall 50. Additional rotation of the bit will cause the anchor to break at the weak joint 14, and continued rotation will cause the base to thread into the sleeve in the manner described.

The embodiment shown in FIG. 6 differs slightly from that of FIGS. 1–4 particularly in the configuration of the sleeve. Thus, the anchor has a base 10 identical to the base of the preferred embodiment, but the sleeve 60 differs from the sleeve 12 in that the inner surface of the sleeve is not internally threaded. In this form, without threads provided internally of sleeve 60, the threads 28 on the external surface of the base cut their own mating threads in the sleeve 60 as the base is turned into the sleeve. The joint 14 breaks in the manner described in connection with the other embodiments. In such an arrangement the locking threads at the end of the base may also be provided to more securely lock the base in the sleeve. The anchor of FIG. 6 may be mounted in place in precisely the same manner as described above in connection with FIGS. 1–4. While this embodiment is described as having an unthreaded sleeve and externally threaded base, the same results may be achieved by threading the sleeve internally and utilizing those threads to cut threads externally on the base when the base is turned into it.

In FIG. 7 the anchor 70 is made with separate sleeve and base. That is, sleeve 72 is not integral with base 74, and there is no weak joint between them which must be broken to mount the anchor in place. The base is merely screwed into the sleeve in the manner of FIG. 1, and the sleeve expands within the member and firmly engages the base.

Figure 9:
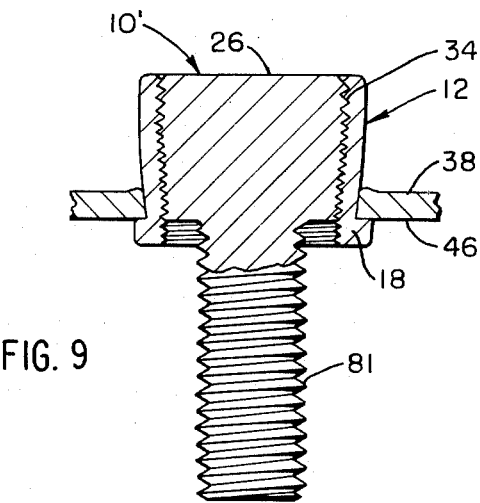

In FIGS. 8 and 9 the anchor 80 is substantially identical to the anchor of FIG. 1 except that the base 10' is modified to eliminate the hollow female receptacle center and to have a solid body with an outwardly extending threaded stud 81. Thus the anchor provides a male stud for supporting objects on the plate 38 rather than a female threaded portion 36 into which a support screw is passed as in the embodiment of FIG. 1. In the embodiment 80 all portions identical to the embodiment of FIG. 1 are given identical reference numbers.

Figure 10:
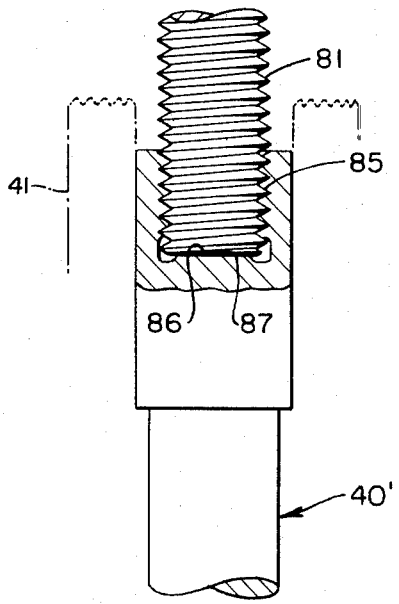
FIG. 10 is a diagrammatic side view of a tool useful with the embodiment of FIGS. 8 and 9.

FIG. 10 illustrates a modified tool for use in assembling the anchor 80. The tool has an anvil 41 as previously described for engaging flange 18 and preventing the sleeve from turning. However, the bit 40 is replaced by a mandrel 40' having a female threaded socket 85 with a bottom wall 86. The threads of socket 85 mate with the threads on the stud 81. The direction of the threads of stud 81 are opposite to the direction of threads 16 and 28. The tool of FIG. 10 is used in the same manner as the tool illustrated in FIG. 2. Thus, the mandrel 40' is turned until wall 86 meets with the lower face 87 of the stud 81. Further turning causes base 10' to be brought down to the finished assembly shown in FIG. 9 whereupon the direction of mandrel turning is reversed and the mandrel removed.

The male or stud embodiment of the anchor has been shown and described with respect to the embodiment of FIG. 1. However, a solid stud carrying base 10' can be used in the embodiments of FIGS. 6 and 7 if desired by replacing base 10 or 74 with base 10'. In the case of the so modified embodiment of FIG. 7, a two-part construction would result with base 10' used in conjunction with sleeve 72. Although it is preferred to use a cylindrical threaded stud 81, the stud need not be threaded or can be of other cross sectional configurations than cylindrical. Of course, corresponding modifications would then be made in socket 85 to provide for required gripping of the stud while turning. For example, if stud 81 is formed as a rectangular cross section rod, socket 85 is not threaded and may be a clamping end or a rectangular socket.

In each of the embodiments of this invention shown and described, the base is secured in the sleeve not by axially pulling the base into the sleeve but rather by turning one with respect to the other. In each embodiment the base 10 or 10' is screwed into the sleeve to the fully assembled position. This arrangement markedly reduces the fracturing stresses applied to the sleeve as it is forced to expand to receive the base because the base is twisted smoothly into the sleeve rather than being drawn axially into it as a wedge. Further, the threads formed on the sleeve and base which mate with one another hold the base in place with a more secure bond between the two than exists when the base is merely held by friction in place within the sleeve.

It should also be appreciated that because the direction of the threads 36 in the base are opposite to the threads which hold the base and sleeve together, when a screw is turned into the threads to secure a part to the member on which the anchor is mounted, any tendency of the base to turn with the screw will urge the base to screw more deeply into the sleeve so as to lock those parts even tighter together. The same function is achieved by the direction of the threads carried by stud 81. Without this arrangement, the base could be pulled out of the sleeve.

While in the embodiments shown threads 34 are suggested to lock the base in the sleeve, it will be appreciated that other forms of locking arrangements may be used. Moreover, the taper of the base may extend the whole length of the base or some lesser portion thereof. The tapered portion is only necessary to lead the base into and expand the sleeve, and less than the entire base length is required for those purposes.

Having described this invention in detail, I claim:

1. A blind anchor comprising
    a circumferentially continuous sleeve,
    said sleeve having a first end carrying an outwardly extending wall retaining means for gripping a first surface of a wall and a second end constructed and arranged to be located beyond said wall first surface,
    a base having a body with a tapered portion whose outer diameter increases in a direction away from said sleeve second end and having an outer diameter at its end adjacent said sleeve second end substantially equal to the inner diameter of said sleeve at its adjacent end,
    said base and sleeve being frangibly joined at said sleeve second end,
    and external threads on the tapered portion of the base adapted to screw into the sleeve as the base is turned into the sleeve to retain the base in the sleeve and expand the sleeve.

2. A blind anchor as described in claim 1 further characterized by,
    said base being frustroconical in shape and internally threaded with internal threads of said base being opposite to said external threads of the base.

3. A blind anchor as described in claim 2 further characterized by,
    said sleeve being internally threaded in the same pitch and direction as said external threads on the base so as to enable the base to screw into the sleeve.

4. A blind anchor as described in claim 2 further characterized by,
    means provided on the outer surface of the base away from the sleeve for locking the base within the sleeve when it is screwed into the sleeve.

5. A blind anchor as described in claim 2 further characterized by, an internal shoulder provided on an end of the base adjacent the sleeve and adapted to be engaged by a bit threaded into the base.

6. A blind anchor as described in claim 2 wherein a closure wall is provided on said base at an end of said base away from said sleeve to close off said internal threads.

7. A blind anchor in accordance with claim 2 further characterized by,
    said wall retaining means comprising an outwardly extending flange,
    an internal shoulder provided by an end of the base adjacent the sleeve and adapted to be engaged by a bit threaded into the base,
    and said sleeve being internally threaded in the same pitch and direction as said external threads on the base so as to enable the base to screw into the sleeve.

8. A blind anchor as described in claim 1 further characterized by,
    said base being coaxially aligned with said sleeve and carrying an outwardly extending stud extending outwardly toward said sleeve first end,
    said stud being threaded with threads opposite in direction to the external threads on the base.

9. A blind anchor as described in claim 8 further characterized by,
    said sleeve being internally threaded in the same pitch and direction as the external threads on the base so as to enable the base to screw into the sleeve.

10. A blind anchor as described in claim 9 further characterized by,
    means provided on the outer surface of the base away from the sleeve for locking the base within the sleeve when it is screwed into the sleeve.

* * * * *